United States Patent Office 3,505,272
Patented Apr. 7, 1970

3,505,272
COPOLYMER ADHESIVE SYSTEM
John Gagliani, Northfield, Minn., assignor to G. T. Schjeldahl Company, Northfield, Minn., a corporation of Minnesota
No Drawing. Filed Nov. 18, 1966, Ser. No. 595,330
Int. Cl. C08f 45/30, 45/44; C08g 20/38
U.S. Cl. 260—33.8                                12 Claims

ABSTRACT OF THE DISCLOSURE

An imide-amide-polyester copolymer particularly useful as an adhesive substance, the composition having the repeating structure identified as follows:

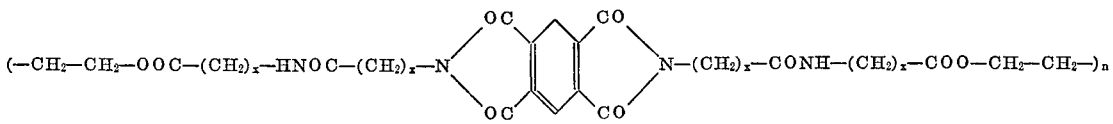

wherein $x$ is a number having a value of from 5 up to about 8, and wherein $n$ represents a number to provide a molecular weight for the product ranging from about 5000 up to about 15,000. Compositions of the present invention are prepared by the formation of N-substituted cyclic bis-imides with a terminal carboxylic group. The terminal carboxylic group is esterified with a bi-functional alcohol to give bis-beta hydroxy ethyl esters, which can be polymerized to form the polymeric compositions of the present invention.

---

The present invention relates generally to an improved copolymer composition, and more particularly to improved imide-amide-polyester substituted material. Compositions of the present invention have been found to be highly desirable as adhesives, particularly high temperature adhesives, the compositions retaining a high degree of their normal adhesion and cohesion characteristics even at substantially elevated temperatures in the range of, for example, an excess of 500° F.

The preferred compositions of the present invention have the repeating structure identified as follows:

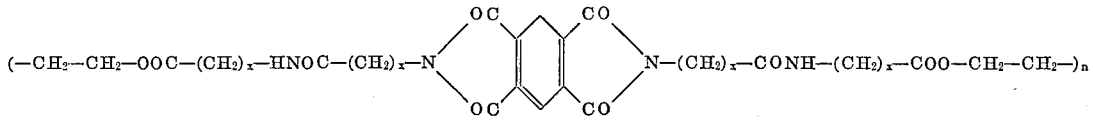

wherein $x$ is a number having a value of from 5 up to about 8, and wherein $n$ represents a number to provide a molecular weight for the product ranging from about 5000 up to about 15,000. The invention contemplates the formation of N-substituted cyclic bis-imides with a terminal carboxylic group. The terminal carboxylic group is capable of being esterified with ethylene glycol or other low-molecular weight glycols to give bis-beta hydroxy ethyl esters or homologous esters. This particular monomeric diester can be polymerized to form the desirable polymeric compositions of the present invention. The polymerization of the above noted monomer is accomplished by subjecting the monomer to high temperature, relatively high vacuum, and a catalyst to yield a modified linear polyester-type resin with a melting point of between 150° C. and 200° C. Catalysts which may be utilized are the conventional catalysts such as antimony oxide, zinc borate, or titanium isopropylate. The formation of a cyclic imide is carried out by reacting a dianhydride such as pyromellitic dianhydride with caprolactam at a temperature of between about 160° C. and 180° C. for 30 minutes.

Therefore, in accordance with the present invention a N-substituted cyclic imide is formed with one or more amide groups in the lateral chain, the chain terminating with a carboxylic group in order to provide a convenient introduction of an ester group which is necessary for the linear polymerization as explained above.

In the preparation of the polymeric composition, a proper ratio of caprolactam to the dianhydride such as pyromellitic dianhydride is required in order to obtain polymers which are soluble in certain organic solvents such as methylene chloride or the like. At a ratio of between 3:1 up to about 5:1, soluble polymers are obtained with the best results being obtained with a ratio of about 4:1.

These polymers have been found to have excellent electrical properties. The polymer has excellent adhesion characteristics when placed in contact with a polyimide (amide) films such as Kapton as sold by the E. I. du Pont de Nemours Corp. of Wilmington, Del., and likewise has excellent adhesion characteristics when used with metallic materials such as, for example, copper foil or aluminum foil as well as with other films. The water absorption characteristics are modest, and hence this characteristic coupled with excellent dielectric properties renders the polymeric substance exceptional for electrical applications, particularly where high temperatures may be encountered.

The mechanical properties including peel strength, cohesive strength, and the like are excellent.

Therefore, it is an object of the present invention to prepare an improved polymeric structure prepared from a reactant mixture such as caprolactam with pyromellitic dianhydride, this being followed with an esterification of the reactant product with a glycol or suitable bifunctional alcohol, and further polymerization to a linear polymer by the use of a catalyst.

It is a further object of the present invention to provide an improved polymeric adhesive composition having desirable adhesion and cohesion properties, along with excellent electrical properties, the material being an esterified reactant product of a reactant mixture including a cyclic imide and a dianhydride.

Other objects of the present invention will become apparent to those skilled in the art upon a study of the following specification and appended claims.

In preparing the compositions of the present invention, the following examples are pertinent:

EXAMPLE I

A reactant mixture is prepared as follows:

Caprolactam—45.26 grams 0.4 M
Pyromellitic dianhydride—21.81 grams 0.1 M

The caprolactam is placed in 1 liter flask equipped with a stirrer, thermometer, inlet tube for an inert gas such as nitrogen or the like, a 36-inch fractionation column, condenser and receiver, and heated to a temperature of between 120–130° C., and the pyromellitic dianhydride is added slowly and the temperature allowed to increase to 165–170° C. and maintained at that temperature for approximately 30 minutes, or until an acid number of 220–230 is obtained. Thereafter, 31.5 g. of ethylene glycol and 0.01 g. of zinc borate as a catalyst are added. The mixture is esterified at a temperature of between 200–230° C. with the esterification continuing until the acid number reaches 1 or below. At this point, the reactants are heated to a temperature of about 240° C. and the excess glycol is thereby distilled off. At a temperature of 240° C., vacuum is applied and continued until the pressure is lowered to between about 1–2 mm. Hg, and the polymerization reaction occurs with evolution of some ethylene glycol and continues at a temperature of between 230–235° C., the polymerization reaction requiring a time of about 1–2 hours. At this time, the mixture becomes quite viscous. The melting point of the resin is about 180° C., and below that the material is a dark solid that may be readily formed into individual squares, segments or pieces. The intrinsic viscosity of the composition is between 0.5 and 0.6 when mixed in a ratio of 0.6 g. per 100 ml. of m-cresol. The molecular weight of the polymeric composition is in the range of about 10,000, and the relative viscosity is about 1.503.

EXAMPLE II 10 grams of the resin prepared in accordance with the technique of Example I and 90 grams of 1,1,2 trichloro ethane are mixed for a period of between 15 and 20 minutes to dissolve. Methylene chloride, 1,1,1 trichloro ethane or similar chlorinated solvents may be used as well. To this mixture are added 0.5 gram of an isocyanate prepolymer or an aromatic isocyanate such as, for example, 2,4-toluene diisocyanate or polymethylenepolyphenyl isocyanate or similar compositions.

The reactant mixture is stable for several days when exposed at room temperature. A film having a thickness of between about 0.5 and 1.0 mil is applied to a film such as, for example, Kapton or other similar film having high temperature stability, and allowed to dry at room temperature for a period of between about 20 and 30 minutes. The coating is further dried at a temperature of about 100° C. for 10 minutes and laminated ultimately at a temperature of between about 230° C. to 245 to a copper foil using a roll-to-roll technique including a pair of rolls having a nip portion therebetween. The laminate may then be post-cured at 150° C. for a period of about 2 hours, this being followed by treatment at about 205° C. for an additional 2 hours. This treatment provides an adhesive bond having a peel strength at a 90° angle of between 8 and 10 pounds per inch at a temperature of 300° F., and 2 to 3 pounds per inch at a temperature of 500° F.

EXAMPLE III

A reactant mixture is prepared as follows:

Caprolactam—90.52 grams (0.8 M)
Pyromellitic anhydride—21.8 grams (0.1 M)

The reactant mixture is treated as indicated in Example I. The final polymer obtained is soluble in 1,1,2 trichloro ethane or methylene chloride only to the extent of about 1 percent, and furthermore not generally suitable as an adhesive.

EXAMPLE IV

A reactant mixture is prepared as follows:

Caprolactam—22.6 grams (0.2 M)
Pyromellitic anhydride—21.8 grams (0.1 M)

The reaction was carried out as indicated in Example I. The final polymer is completely insoluble in chlorinated solvents and it is not an adhesive.

EXAMPLE V

A reactant mixture is prepared as follows:

Caprolactam—56.58 grams (0.5 M)
Pyromellitic anhydride—21.8 grams (0.1 M)

The final polymer obtained is soluble in chlorinated solvents, but it is highly brittle and is found to adhere only to a metallic surface such as copper. Films of this adhesive on flexible substrates such as Kapton have been found to have inferior physical properties and may crack during drying at 100°C.

As indicated in Example I, ethylene glycol is used in the formation of hydroxyl terminated esters. In addition to ethylene glycol, other bi-functional linear alcohols such as triethylene glycol, cyclohexane dimethanol or other aliphatic glycols may be used. It has been found that alcohols of higher functionality such as trimethylol propane, penta-erythritol, and similar materials are not suitable, since they provide polymers which generally have poor adhesive properties, poor solubility and not suitable to form linear polymeric resins.

In addition to being soluble in chlorinated solvents, it has been found that the resin of the present invention is soluble in dimethyl formamide or dimethyl acetamide. The solubility characteristics of the material renders it valuable for use as an adhesive in different systems and applications where chlorinated solvents cannot be used.

In addition to having excellent adhesion properties for copper, the adhesive compositions of the present invention have equally good adhesion characteristics for aluminum and other metals. Since it adheres well to flexible films such as, for example, Kapton and the like, the material finds excellent application for use as a coverlay in an electrical circuit, particularly flexible electrical circuits.

In accordance with Example V, it has been found that the physical properties of the final polymer product are somewhat brittle, however for certain applications, its adhesion and adhesive properties are considered sufficiently sound to render the material useful as an adhesive in certain applications. It is believed, however, that ratios of greater than about 5:1, of caprolactam to pyromellitic dianhydride would render the material generally undesirable as an adhesive. As also previously indicated, ratios of about 3:1 are the lower limits desirable for preparing adhesive mixtures, and when the ratio of caprolactam to pyromellitic dianhydride is less than about 3:1, the final product is generally insoluble in chlorinated and other solvents indicated. Therefore, the desirable ratio for the reactants is between the reasonable limits of about 3:1 up to about 5:1, with the most desirable properties being achieved at a ratio of about 4:1.

In addition to the use of caprolactam, such as e-caprolactam, other oxo cyclic imines such as caprylic-lactam or omega-caprolactam may be utilized. These materials are, of course, commercially available.

Pyromellitic dianhydride has been found to provide the desirable aromatic portion of the composition, however it will be appreciated that other aromatic dianhydrides such as, for example, 3,3',4,4' benzophenone tetracarboxylic dianhydride 1,4,5,8 naphthalene tetracarboxylic dianhydride and others of general formula:

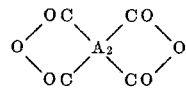

where $A_2$ represents an aryl group, may be utilized. The reactant ratios of other cyclic imines, or other aromatic dianhydrides will be, of course, in the same range as set forth in connection with the ratios of Examples I and II, this being in the desirable range of between about 5:1 and 3:1 with the optimum properties being achieved at a ratio of 4:1.

It will be appreciated that these examples are given for purposes of illustration only and that those skilled in the art may depart from these specific examples without actually departing from the spirit and scope of the present invention.

What is claimed is:
1. The method of preparing a polymeric substance suitable for use in an adhesive composition comprising:
(a) forming a first reactant mixture of an aromatic dianhydride of the general formula

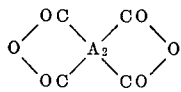

wherein $A_2$ represents an aryl group; and a cyclic aliphatic oxoimine selected from the group consisting of e-caprolactam, O-caprolactam, and caprylic lactam, said cyclic aliphatic oxoimine being included in said first reactant mixture in a ratio of about 3 molecular parts up to about 5 molecular parts per molecular part of aromatic dianhydride;
(b) reacting said first reactant mixture of an elevated temperature to form a monomer reactant product;
(c) forming a second reactant mixture by the addition of a low-molecular weight bi-functional alcohol

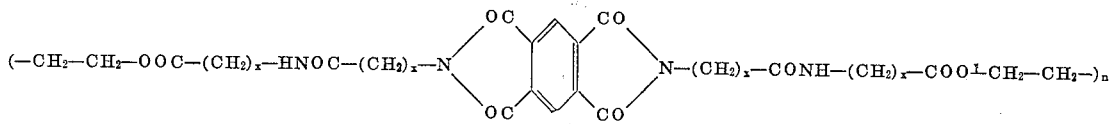

selected from the group consisting of ethylene glycol, triethylene glycol, and cyclohexane dimethanol, to said first reactant product and heating the said second reactant mixture until esterification is substantially complete and thereafter polymerizing the product at an elevated tempertaure and reduced pressure and in the presence of a catalyst to form a linear polyester resin.

2. The method as set forth in claim 1 being particularly characterized in that said aromatic dianhydride is pyromellitic dianhydride.

3. The method as set forth in claim 2 being particularly characterized in that said ratio is about 4:1.

4. The method as set forth in claim 2 being particularly characterized in that said cyclic aliphatic oxoimine is caprolactam.

5. The method as set forth in claim 2 being particularly characterized in that said cyclic aliphatic oxoimine is caprolactam, and said bi-functional alcohol is ethylene glycol.

6. The method as set forth in claim 5 being particularly characterized in that said cyclic aliphatic oxoimine is caprolactam, said bi-functional alcohol is ethylene glycol, and said ratio has a value of about 4:1.

7. The method as set forth in claim 5 being particularly characterized in that said cyclic aliphatic oxoimine is caprolactam, said bi-functional alcohol is ethylene glycol, said ratio has a value of about 4:1 and a catalyst consisting of zinc borate is present in said polymerization reaction.

8. The method as set forth in claim 6 being particularly characterized in that the reactant product obtained from said second reactant mixture is dispersed in a chlorinated hydrocarbon solvent.

9. The method as set forth in claim 6 being particularly characterized in that the reactant product obtained from said second reactant mixture is combined with an isocyanate selected from the group consisting of 2,4 toluene diisocyanate and polymethylene-polyphenyl isocyanate.

10. A polymeric substance suitable for use in an adhesive composition comprising:
(a) an imide-amide-polyester mixture having a structural formula:

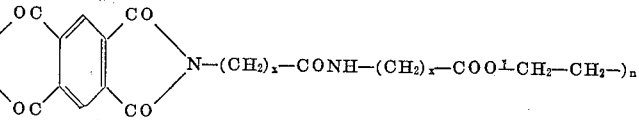

wherein $x$ is a number having a value of from about 5 up to about 8, and wherein $n$ represents a number having a value to provide a molecular weight for said polymer ranging from between about 5000 up to about 15,000, and said polymer being soluble in chlorinated hydrocarbon solvents, dimethyl formamide or dimethylacetamide.

11. The adhesive composition as defined in claim 10 being particularly characterized in that $x$ has a value of about 5.

12. The adhesive composition as set forth in claim 11 being particularly characterized in that said molecular weight is about 10,000.

References Cited

UNITED STATES PATENTS 3,238,181   3/1966   Anderson.

FOREIGN PATENTS 973,377   10/1964   Great Britain.

ALLAN LIEBERMAN, Primary Examiner

U.S. Cl. X.R.

260—32.6, 75, 78